Henry T. Jaggers
Michael P. Grant
INVENTORS

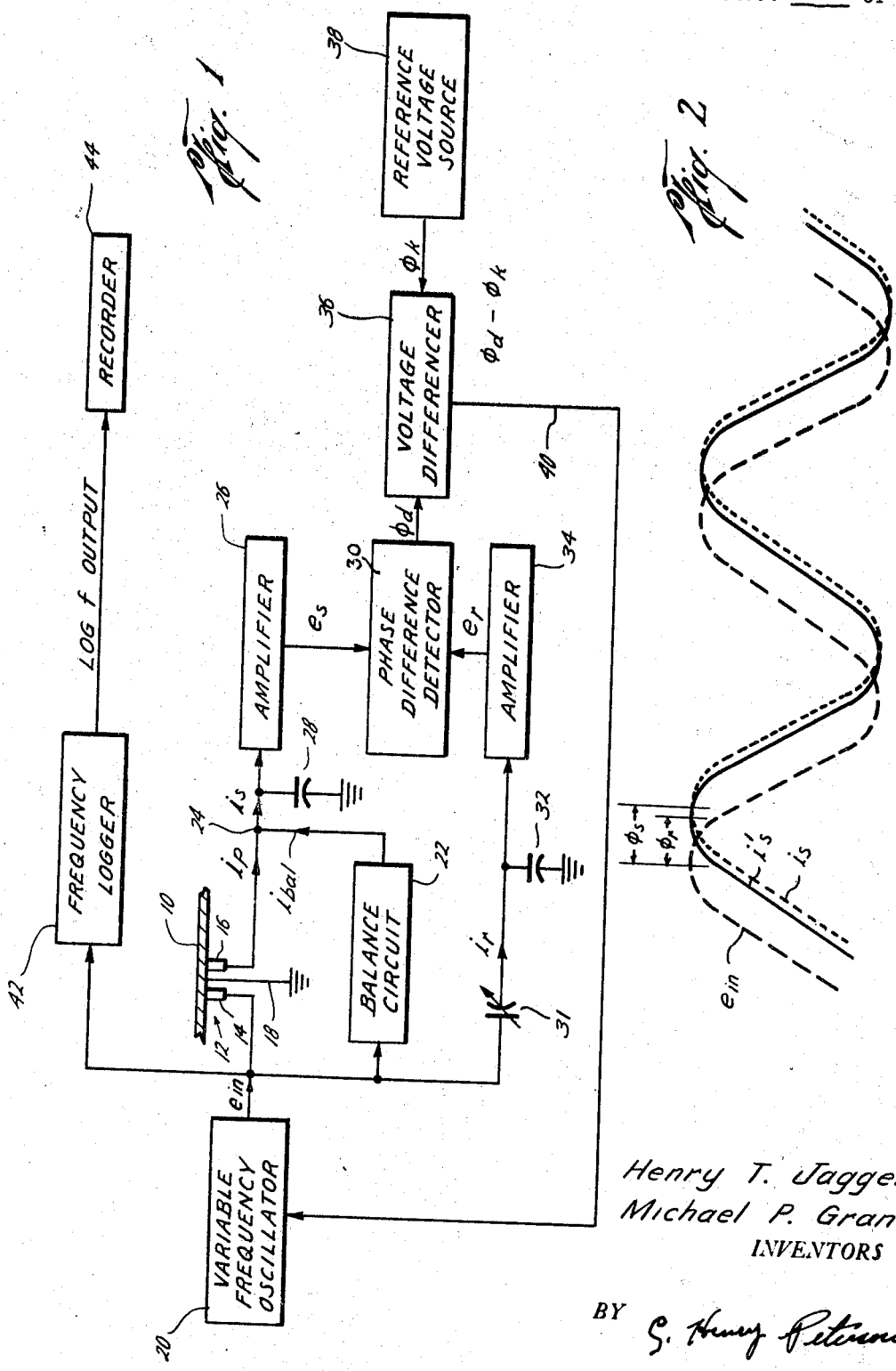

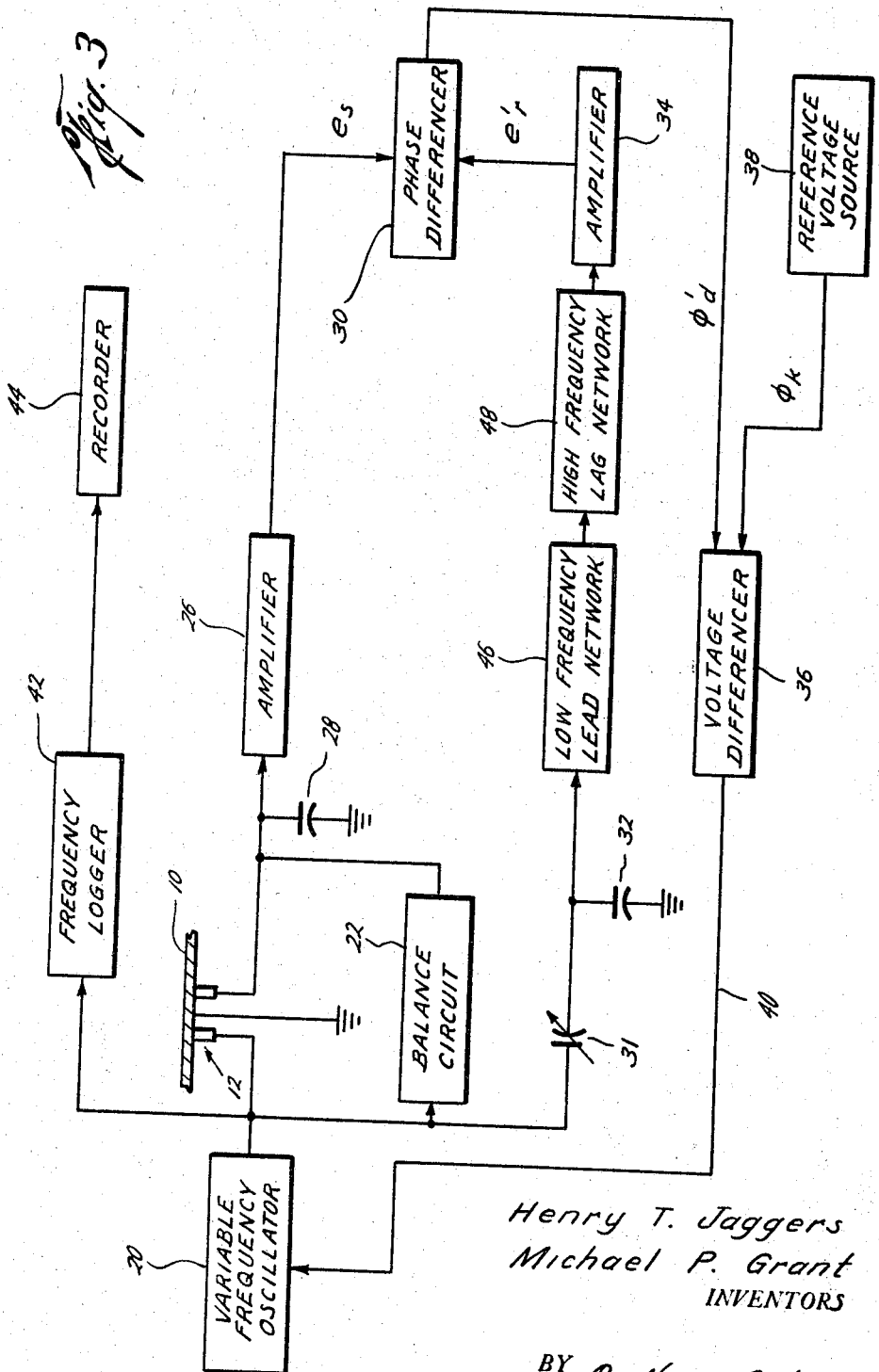

BY G. Henry Peterson

AGENT

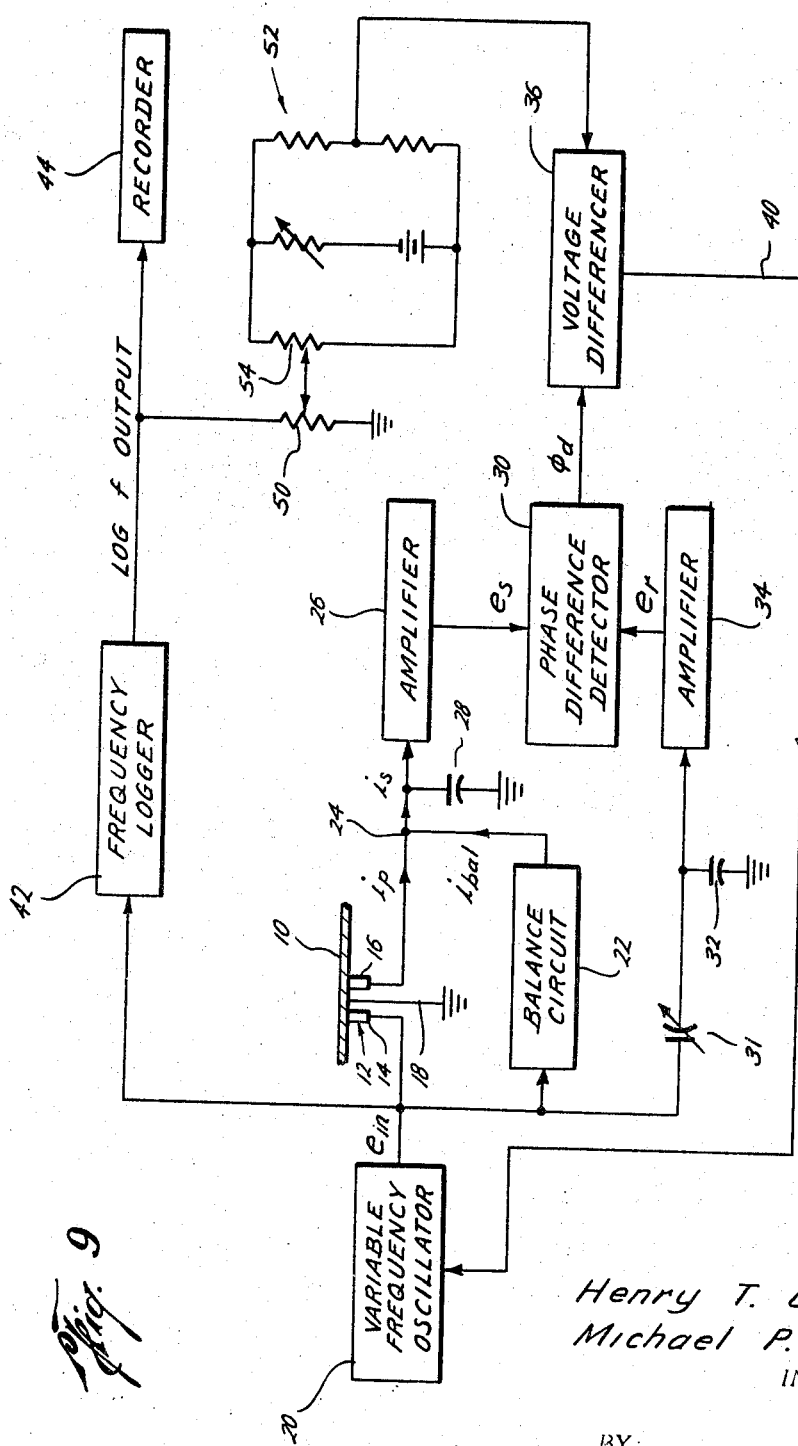

United States Patent Office 3,443,218
Patented May 6, 1969

3,443,218
HYBRID PHASE DIELECTRIC MATERIALS GAUGING SYSTEM WITH INPUT SIGNAL FREQUENCY AUTOMATICALLY VARIABLE IN RESPONSE TO A DEVIATION FROM A REFERENCE PHASE SHIFT WHICH IS ALSO VARIABLE WITH FREQUENCY
Henry T. Jaggers and Michael P. Grant, Columbus, Ohio, assignors to Industrial Nucleonics Corporation, a corporation of Ohio
Filed July 7, 1966, Ser. No. 563,466
Int. Cl. G01r 27/26
U.S. Cl. 324—61                                  19 Claims

ABSTRACT OF THE DISCLOSURE

Specifically disclosed is a method and apparatus for measuring a variable property (such as percentage moisture content) of a dielectric material (such as a traveling paper sheet) using a "capacitance" probe having spaced electrodes energized with a radiofrequency voltage. The phase angle between the applied voltage and the probe current tends to vary with changes in the moisture content, but a feedback system detects phase angle deviations from a selected reference value and automatically varies the frequency of the applied voltage to counteract the changes in phase angle. In an intermediate range of operating frequencies, changes in phase angle are substantially eliminated; whereas in low and high frequency ranges the phase angle is permitted to change according to a predetermined function of the frequency. The instantaneous operating frequency provides the indication of the percentage moisture content, which can be measured over a relatively wide range utilizing a limited total range of frequencies.

---

This invention relates to a system for determining a variable property of a dielectric material using a probe having spaced electrodes energized by an alternating current input signal and electrically coupled to the material. Generally it relates to a system wherein variations in the measured property are manifested by variations in the phase shift of a detected signal from the probe, and wherein said phase-shift variations are counteracted by opposite phase-shift variations produced by automatically varying the frequency of the input signal to maintain a reference value for the phase shift between the input signal and the detected signal. More particularly the present invention relates to a system in which the reference value for the phase shift is also automatically variable as a function of the operating frequency, which is correlated with the value of the measured property.

While dielectric gauging apparatus according to the invention is adapted for quantitative measurement of at least one property of any one of a number of dielectric materials having appreciable conductivity in relation to their electric susceptibility, the invention is particularly directed to a moisture gauge for measuring solid materials having a variable mass per unit length, area or volume. In this application a gauge according to the invention is adapted to provide an indication of percentage moisture content which is substantially independent of mass variations.

The present invention is an improvement on the system which is described and claimed in a co-pending application Ser. No. 563,487, filed July 7, 1966 by William L. Adams. The Adams application discloses a dielectric materials gauging system of a kind which is referred to as a constant-phase system. Another form of a constant-phase dielectric materials gauge is disclosed in a co-pending application Ser. No. 563,609, filed July 7, 1966 by Charles F. Spademan.

In a constant-phase dielectric materials gauging system, a variable frequency alternating voltage source and a detector are electrically coupled to the material by means of a probe having spaced electrodes. The applied voltage from the source produces a complex current through the probe which is detected by the detector to provide a signal which has a phase shift dependent on a variable property of the material, such as its moisture content, which is to be measured. The phase shift is also dependent on the frequency of the source which provides the input voltage. By utilizing a form of negative feedback, the frequency of the input voltage source is continuously and automatically adjusted to maintain the phase shift of the detected signal substantially constant at a reference value.

In many dielectric materials gauging applications, the measured property of the material is normally expected to vary over a considerable range. In the measurement of percentage moisture content in the paper which is continuously produced by a paper-making machine, for example, the percent moisture may be subject to rather wide variations, say, from two or three percent to perhaps twelve to fifteen percent during a given run of paper. In a constant-phase moisture gauge which is to measure this wide range of moisture content, the restriction to a single fixed value for the reference phase-shift parameter imposes the requirement that the oscillator and other circuits of the instrument be adapted for operation over a very wide range of frequencies. However, to maintain satisfactory performance, conventionally designed oscillators, phase demodulators and other circuitry of the instrument are usually limited to a much smaller range of operating frequencies.

It has therefore been proposed to provide the constant-phase instruments with a form of range switching, comprising a selector switch or a continuously variable adjustment, to make available a selection of several values for the reference phase-shift parameter. For example, with the instrument set to maintain a constant phase shift at the optimum value of 45°, an intermediate range of percentage moisture in paper can be measured as the frequency is automatically swept over the usable operating range. With the phase-shift parameter set for 25° instead of 45°, the lower end of the percentage moisture range can be covered with the same range of operating frequencies. Similarly, with a 75° setting, a higher range of moisture content can be measured.

The range switching expedient, however, is not an entirely satisfactory arrangement because during the operation of a papermaking machine, for example, the moisture content may change considerably and rapidly during a given production run, frequently shifting back and forth between two or more of the established ranges of measurement. Where only manual range switching is provided, close attention on the part of a human operator is needed to see that all required range changes are made correctly and at the proper time, if complete and accurate measurements are desired. Since the operator cannot ordinarily give the instrument such close supervision, automatic range-switching provisions are almost indispensable. However, this requires the addition of other complicated equipment to the system, at additional cost, and at the expense of increased maintenance and decreased reliability. Range switching in the measuring instrument also generally makes necessary range-switching provisions in associated equipment, such as automatic process control systems and computers which utilize signals from the instrument. Where automatic recording equipment such as a strip-chart recorder is used, additional provisions are generally necessary to identify on the record the particular range of measurement in use at a given time.

In an instrument according to the present invention, the reference value for the operating phase shift is not a fixed parameter, but is caused to vary per se according to a desired function of the operating frequency. This mode of operation can be effected according to the invention by the use of rather simple modifications to the constant-phase system. Two specific arrangements are described in detail herein and several other arrangements are suggested. Further, somewhat different equivalent arrangements will no doubt become apparent to those skilled in the art once the operating principle of an apparatus according to this invention is made known.

It is an object of this invention to provide a dielectric materials gauging system capable of providing measurements over a wide range of variation in the material property to be measured while operating over a modest range of frequencies.

It is another object to provide a dielectric materials gauging system which provides such an extended range of measurement while retaining the advantages of a constant phase measuring system including increased independence of mass variations in the material, increased tolerance for phase and amplitude instabilities in the probe-balance circuitry and phase-measuring circuitry, and reduced error due to the coupling capacitance between the probe and the material to be measured.

It is still another object to provide a dielectric materials gauging system in which the requirement for range switching can be eliminated in most applications.

It is yet another object to provide a dielectric material gauging instrument capable of measuring an adequate range of values of the material property to be measured while operating over a range of frequencies within the capability of conventionally designed oscillators, phase demodulators and other circuitry.

It is also an object to provide simplified circuitry for converting a constant-phase dielectric materials gauging system to a hybrid system with a substantially increased range of measurement.

It is a more specific object of the present invention to provide an improved instrument for measuring percentage moisture content in paper and the like.

Further objects and advantages of the invention will become apparent from the following detailed description of certain specific and exemplary embodiments of the invention, taken in conjunction with the appended drawings in which:

FIG. 1 is a simplified block diagram of a constant-phase measuring system of a type which has been previously proposed in the co-pending applications of Adams and Spademan, supra, to provide a basis for an explanation of the present invention.

FIG. 2 is a waveform plot showing various phase relationships between the applied input voltage $e_{in}$ and the unbalance signal current $i_s$ in the probe circuit of FIG. 1.

FIG. 3 is a block diagram of one form of a hybrid-phase system according to the present invention.

FIG. 9 is a schematic diagram of another form of hybrid-phase system according to the invention.

Figure 4:
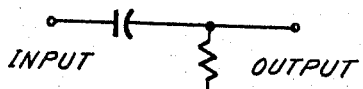
FIG. 4 shows a suitable low-frequency lead network for use in the system of FIG. 2.

Referring now to the drawings, in FIG. 1 there is shown a simplified diagram of a constant-phase measuring system of the type particularly described in the Spademan application, supra. Here the numeral 10 indicates a dielectric material having a variable property to be measured. It may be assumed that the material 10 is the output product of a continuous manufacturing process for forming the material in a continuous length which passes adjacent to a probe 12. Probe 12 comprises a pair of spaced electrodes 14 and 16 which are normally arranged on the same side of the traveling material 10 and with a grounded guard electrode 18 between the principal probe electrodes 14 and 16. The electrodes are supported by a suitable mechanical structure (not shown) whereby the probe electrodes are maintained in physical contact with the material 10 using a light pressure so as to avoid physical damage to the material.

The probe 12 is energized with an alternating input voltage $e_{in}$ supplied from a variable-frequency oscillator 20. The input voltage $e_{in}$ is also applied to a balance circuit 22. As a result of the voltage applied to the probe, a current $i_p$ flows through the probe and into a junction point 24. As a result of the input voltage applied to balance circuit 22, a current $i_{bal}$, supplied through the balance circuit, also flows into the junction point 24. Junction point 24 is at the input of a detector amplifier 26 having a shunt capacitor 28 connected between the input and ground to provide a low impedance path to ground for the probe current and balancing current.

This circuit is initially balanced by removing the probe 12 from the vicinity of the measured material 10 and adjusting balance circuit 22 so that the probe current value $i'_p$, obtained in the absence of the material, is balanced out by an equal and oppositely directed current $i_{bal}$, that is, so that $i'_p + i_{bal} = 0$. Under this condition, there is no input signal to amplifier 26, and the balanced condition is indicated by zero output from amplifier 26.

When the probe is again placed next to the material 10, the current $i_p$ through the probe exhibits an increase in amplitude and a change in phase, so that it is no longer equal and opposite to the current supplied through balance circuit 22. This results in an unbalance signal current $i_s = i_p + i_{bal}$ which charges capacitor 28 and produces an input voltage to amplifier 26.

The unbalance current $i_s$ through the probe is a complex current, having a real component which is in phase with the voltage $e_{in}$ applied to the probe, and an imaginary component which is in quadrature with the applied voltage. The relative magnitudes of the in-phase and quadrature components determines the phase shift of the current $i_s$ with respect to the applied voltage $e_{in}$.

FIG. 2 is a plot of various phase relationships between the voltage $e_{in}$ shown by the dashed line and the unbalance current or signal current $i_s$ through the probe. These curves have been normalized to the same amplitude in order to more clearly show the phase relationships. The phase shift between the input voltage $e_{in}$ and the signal current $i_s$ (whose waveform is shown by the dotted line) is identified on the drawing as $\phi_s$. With a fixed value for the oscillator frequency, the phase shift $\phi_s$ depends on the complex dielectric constant of the measured material 10.

For example, if the material 10 is paper having a variable moisture content, the phase shift $\phi_s$ is a function of the percentage moisture content in the paper. More-over, if the phase shift is measured in a manner which is independent of the amplitudes of the input voltage and the unbalanced signal current, in the manner depicted by the waveforms of FIG. 2, the phase shift provides a measure of the percentage moisture content in the paper which is substantially independent of the mass per unit area or "basis weight" of the paper. On the other hand, for a given constant value of the moisture content, the phase shift $\phi_s$ of the unbalance signal is a function of the frequency of the input voltage $e_{in}$ supplied by oscillator 20.

In a constant-phase system, the actual value of the phase shift $\phi_s$ is compared with a desired reference value $\phi_r$ of the phase shift parameter. When there is a difference between the actual value of the phase shift and the reference value thereof, the frequency of oscillator 20 is automatically changed in such a direction that the phase shift $\phi_s$ is made to correspond with the reference value $\phi_r$ according to the system equation $\phi_s - \phi_r = 0$. That is, the system operates so that any phase-shift variations produced by changes in the dielectric properties of the material 10 are automatically counteracted by opposite phase-shift variations produced by automatically varying the frequency of the input signal to maintain the phase shift constant at the reference value $\phi_r$. With reference to FIG. 2, the effect of the frequency variation is to cause the dotted-line waveform labeled $i_s$ to coincide with the waveform $i'_s$ shown by the solid-line waveform which has the desired reference value $\phi_r$ for the phase shift.

With reference again to FIG. 1, the charging of input shunt capacitor 28 by the signal current $i_s$ produces a voltage across the capacitor which is amplified by amplifier 26 to produce an output voltage $e_s$. The amplifier output voltage is fed to one input of a phase-difference detector 30. Another input of the phase-difference detector receives a reference voltage $e_r$. To obtain the reference voltage, the input voltage $e_{in}$ which is applied to the probe is also applied to the input of a capacitive attenuator comprising capacitors 31 and 32 which provides at its output a signal having an amplitude and an impedance level comparable to that of the signal obtained from the probe with the paper thereat, but without the phase shift which characterizes the probe circuit unbalance signal. The attenuated voltage, obtained by charging capacitor 32 with the reference current $i_r$ which flows through capacitor 31, is applied to the input of a reference channel amplifier 34. The system is arranged so that the amplifiers and other circuit components, in the reference channel which delivers the reference voltage $e_r$, have amplification and phase shift characteristics similar to the circuit components in the signal channel which delivers the signal voltage $e_s$. Since the signal voltage $e_s$ may be subject to substantial changes in amplitude due to variations in the basis weight and moisture content of the material 10 as well as changes in the goodness of the electrical coupling of the probe 12 to the material, the phase-difference detector is adapted, through the use of known techniques, to detect the phase difference between the signals $e_s$ and $e_r$ in a manner substantially independent of the amplitude of these signals. The phase difference detector provides a D.C. voltage output, identified on the drawing as $\phi_d$, whose amplitude is proportional to the phase difference between the signal voltages $e_s$ and $e_r$. This voltage signal $\phi_d$ is indicative of the phase shift $\phi_s$ (FIG. 2) between the input voltage $e_{in}$ applied to the probe 12 and the unbalance current $i_s$ through the probe due to the presence of the material 10 thereat.

The output of the phase-difference detector 30 is applied to one input of a voltage differencer circuit 36. Differencer 36 also receives at its other input a reference voltage, identified on the drawing as $\phi_k$, from a reference voltage source 38. The reference signal $\phi_k$ is indicative of the reference value $\phi_r$ (FIG. 2) for the phase shift parameter. The signals $\phi_d$ and $\phi_k$ are compared in the voltage differencer 36, which provides a feedback signal on line 40 indicative of the difference $\phi_d - \phi_k$ between the detected phase shift and the reference value for the phase shift. This feedback signal is utilized to control the frequency of the variable frequency oscillator 20 in a direction such that the difference between $\phi_d$ and $\phi_k$ is reduced substantially to zero.

The feedback loop here represented by line 40 may include elements of a servomechanism (not shown) comprising motor means for mechanically adjusting a variable frequency control element in oscillator 20. Preferably, however, oscillator 20 comprises a voltage-controlled oscillator and the feedback loop includes a feedback amplifier (not shown) having high open-loop gain and internal negative feedback stabilization. Such a feedback amplifier is adapted to provide a robust oscillator-control voltage in response to a very small input signal, so that the system as a whole comprises a servo system for maintaining the detected phase shift $\phi_d$ substantially equal to the reference phase shift $\phi_k$. The effect of this arrangement is to maintain the phase shift $\phi_s$ (FIG. 2) between the applied voltage $e_{in}$ and the probe circuit unbalance current $i_s$ substantially constant at the value $\phi_r$. Thus as the material 10 to be measured moves continuously past the probe 12, the frequency of oscillator 20 varies continuously as a function of the changes in the material.

The output of the oscillator which drives the probe is also applied to the input of a frequency logger 42. The frequency logger converts the frequency to a D.C. voltage which varies linearly with the logarithm of the frequency. The voltage output of the frequency logger thus varies in a substantially linear way with the measured property of the material. When operating as a moisture gauge, the voltage output of the frequency logger is a substantially linear function of percentage moisture content, and this voltage may be applied to a suitable recorder 44 which is directly calibrated to read out percentage moisture content.

FIG. 3 shows a dielectric materials gauging system such as a moisture gauge which has been modified according to the invention to convert the constant-phase system of FIG. 1 to a hybrid-phase system. The system of FIG. 3 differs from the system of FIG. 1 in that a low-frequency lead network 46 and a high-frequency lag network 48 have been inserted in the reference signal channel whereby the input voltage $e_{in}$ from oscillator 20 is coupled to the reference signal input to the phase differencer 30.

Figure 5:
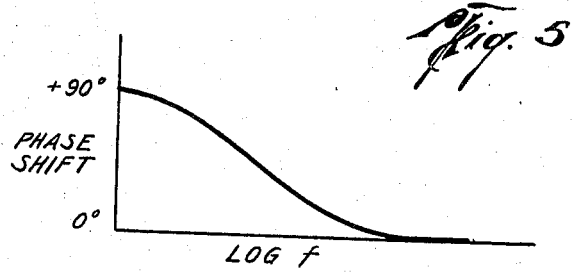
FIG. 5 is a graph showing the phase-shift characteristics of the circuit of FIG. 3.
Figure 6:
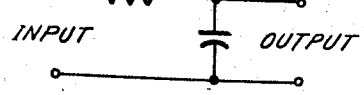
FIG. 6 shows a suitable high-frequency lag network suitable for use in the system of FIG. 2.
Figure 7:
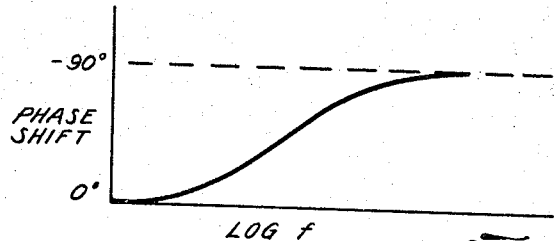
FIG. 7 is a graph of the phase-shift characteristics of the circuit of FIG. 5.

A suitable low-frequency lead network 46 is provided by the simple resistance-capacitance circuit shown in FIG. 4. FIG. 5 is a typical plot showing the phase of the output voltage from this network with respect to a sinusoidal volage applied to its input. As shown, the output voltage leads the input voltage by a phase angle which approaches ninety degrees (+90°) as the frequency approaches zero. At high frequencies, the phase lead becomes negligible. A suitable high-frequency lag network 48 is provided by the simple resistance-capacitance circuit shown in FIG. 6. The phase shift characteristics of the latter circuit are shown in FIG. 7. As shown, the output voltage is substantially in phase with the input voltage at low frequencies. At high frequencies, the output voltage lags the input voltage with a phase angle which approaches —90° as the frequency increases. In the original version of the instrument of FIG. 3, the low frequency lead network was designed to produce a phase shift of +20° at a frequency of 100 c.p.s. The high-frequency lag network was designed to produce a phase shift of —30° at a frequency of 500 kilocycles per second. The two networks can be designed independently, in accordance with the desired response characteristics of the instrument in the low and high frequency ranges respectively.

It is apparent that a great variety of equivalent circuits can be used to perform the functions of the lead and lag networks illustrated. The lead and lag networks may be incorporated into amplifier 34, or in separate amplifiers, and their location in the reference channel is immaterial from an operating stand-point. It is apparent for example that a suitable low-frequency lead function may be provided by a suitable capacitor in amplifier 34. Likewise the high-frequency lag function can be obtained in a vacuum tube or transistor amplifier by connecting a suitable roll-off capacitor from the plate or collector of the tube or transistor to ground.

Figure 8:
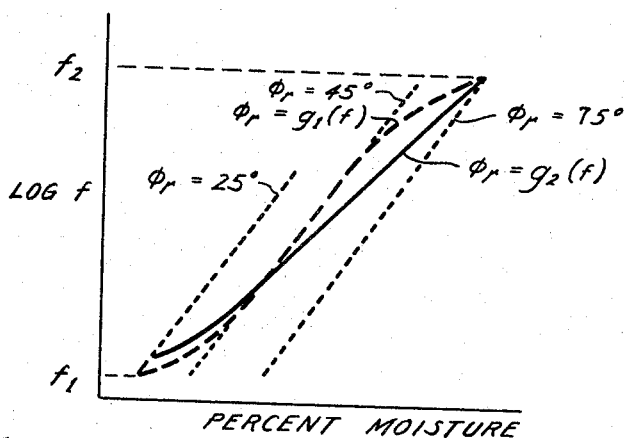
FIG. 8 is a graph showing the operating characteristics of the constant-phase system, a hybrid-phase system according to FIG. 3 and a hybrid-phase system according to FIG. 9.

The effect of the lead and lag networks on a moisture gauge according to the invention is shown in FIG. 8, in which the frequency of oscillator 20 is plotted on a logarithmic scale as a function of the percent moisture in paper as plotted on a linear scale. The response of the hybrid system of FIG. 3 is shown by the curve labeled $\phi_r = g_1(f)$. This notation indicates that instead of operating with a constant value for the phase shift parameter $\phi_r$ (FIG. 2) the reference phase shift for the servo is now variable with frequency. For comparison with the operation of the constant phase system of FIG. 1, FIG. 8 also shows plots of the constant-phase instrument's characteristics for three different constant values of the phase shift parameter $\phi_r$. These values of 25°, 45° and 75° are of course obtained by selecting three corresponding values for the reference signal $\phi_k$ obtained from the reference voltage source 38. It is apparent that for a given range of operating frequencies $f_1$ to $f_2$, the hybrid instrument is capable of providing measurements over a much wider range of moisture contents than is obtainable with a constant phase system operating with any selected value of the phase shift parameter $\phi_r$. While the use of both lead and lag networks is illustrated, it is apparent that for many applications the use of only a lead network, or only a lag network, can provide a sufficient extension of the range into the region of interest, in which case one of the networks can be omitted.

The oscillator frequency, which varies as a quasi-logarithmic function of percent moisture, is converted by the frequency logger 42 to a D.C. voltage which varies linearly with percent moisture. It is understood that frequency logger 42 includes a suitable function generator such as a network of biased diodes. The bias voltages applied to the respective diodes are independently adjustable so that the desired linear output voltage is obtained. The output voltage from the frequency logger is calibrated and compensated for the temperature of the material 10 in the manner which is explained in the co-pending application of Spademan, supra.

FIG. 9 depicts a second example of a hybrid phase system according to the invention, which again comprises a rather simple modification of the constant phase system of FIG. 1. Again, the modification comprises the addition to the constant phase system of means for variably biasing the operation of the feedback frequency control device according to a predetermined function of frequency. In this case, instead of introducing a frequency-dependent phase shift into the reference voltage for the phase difference detector, a frequency-dependent biasing voltage arrangement is used. This biasing voltage is preferably derived from the output of the frequency logger, and applied, through a suitable voltage level shifting circuit, to an appropriate element in the oscillator frequency control system.

With reference to FIG. 9, the reference voltage source 38 is replaced by circuitry for providing a feedback signal derived from the output of the frequency logger 42. To this end, the output voltage from the frequency logger is applied across a variable potentiometer 50. The portion of the frequency logger output voltage derived from the variable tap of potentiometer 50 is applied to the reference phase shift input of the voltage differencer 36 through a voltage level shifter. The voltage level shifter conveniently comprises a conventional bridge circuit 52 which is operated in an unbalanced condition to function as a variable voltage source. Level shifter 52 adds a fixed increment of biasing voltage to the variable voltage obtained from the tap of potentiometer 50. The increment of voltage supplied by the bridge circuit is adjustable by means of a variable potentiometer 54 in the bridge circuit, according to conventional practice. The system equation for the dielectric gauge of FIG. 9 is $$\phi_d - \phi'_k + M \log f = 0$$

In this equation $\phi_d$ is represented by the output voltage from the phase difference detector 30 which is indicative of the detected phase shift in the unbalance signal from the probe. $\phi'_k$ is a nominal reference value for the detected phase shift which is represented by the constant increment of voltage derived from the level shifter 52, and is adjustable by means of potentiometer 54 in the bridge circuit. The constant M is adjustable by means of potentiometer 50 across the output of frequency logger 42.

The performance of the system of FIG. 9 as a moisture gauge for paper is illustrated by the dashed line characteristic labeled $\phi_r = g_2(f)$ shown on FIG. 8. Except at the low end of the curve, the semi-logarithmic plot of the oscillator frequency is a remarkably linear function of the percent moisture in the paper. The slope of this function, which determines the sensitivity of the instrument to changes in moisture content is adjustable as desired by varying the setting of potentiometer 50. Likewise the position of this line, which determines the operating range of the moisture gauge, is adjustable by means of potentiometer 54 in the level shifter 52.

The gauging systems of FIGS. 3 and 9 show two preferred embodiments of the present invention in detail. It is apparent that other equivalent embodiments of the invention could be made by other suitable modifications of the apparatus of FIG. 1. For example, it would be possible, although rather complicated, to achieve hybrid operation according to the invention by introducing suitable frequency-dependent phase shifts into the signal $e_s$ at the output of the detector amplifier 26, that is, by introducing a lagging phase shift at low frequencies and a leading phase shift at high frequencies. It would also be possible to add a voltage proportional to the output of frequency logger 42 to the voltage represented $\phi_d$ at the output of the phase difference detector 30. Such a voltage could be introduced with or without the use of a level shifting network in the $\phi_d$ signal line. In this case, the level shifting network might replace the reference voltage source 38. It is further apparent that a feedback signal derived from frequency logger 42 could be introduced into the feedback signal channel on line 40 which controls the frequency of oscillator 20.

According to these and other possible arrangements of the apparatus, the basic operation of the instrument remains the same. An alternating voltage is applied to the probe, resulting in a complex current through the probe which exhibits a variable phase shift $\phi_s$ (FIG. 2) dependent on a variable property of the material to be measured. The phase shift $\phi_s$ is compared with a reference value $\phi_r$, and the frequency of the input voltage is automatically varied to maintain the phase shift $\phi_s$ equal to $\phi_r$. The hybrid operation according to the invention is achieved by automatically varying the reference value $\phi_r$ for the phase shift as a function of the operating frequency.

To implement this automatic variation of the reference value $\phi_r$, the preferred systems provide means for selecting a constant, nominal reference value for this quantity, which is set into the instrument by adjusting the voltage output of the reference voltage source 38 of FIG. 3 or the level shifter circuit 52 of FIG. 9. Preferably, the value selected is 45°, as shown by the hybrid system response curves of FIG. 8.

When the signal phase shift $\phi_s$ deviates from the nominal reference value, the systems provide means exemplified by voltage differencer 36 and feedback line 40 for producing and feeding back a phase shift deviation signal which causes the frequency of the alternating voltage applied to the probe to vary in the direction which tends to reduce the phase shift deviation to zero. In an intermediate frequency range, the feedback control device is permitted to readjust the frequency to such an extent that the phase shift deviation is reduced substantially to zero, as in a constant-phase system.

In the hybrid system of FIG. 3, the phase shift deviation is substantially zero over a rather wide range of intermediate frequencies, as shown by FIG. 8, wherein the response curve labeled $\phi_r = g_1(f)$ coincides with the 45° constant-phase system response curve $\phi_r = 45°$ over a major portion thereof. In the low and high frequency ranges, however, the phase shifts produced by the lead and lag networks 46 and 48 modify the ouput of the phase differencer 30 and in turn the output of the voltage differencer 36. This introduces into the phase deviation signal an offsetting signal increment which varies with the frequency so as to prevent the phase shift deviation from being reduced to zero, as is indicated by the departure of the hybrid system response curve from the constant-phase response curve in the low and high frequency regions.

In the hybrid system of FIG. 9, an offsetting signal increment is provided over the entire frequency range except at the point in the intermediate frequency range where the hybrid response curve labeled $\phi_r = g_2(f)$ crosses the constant-phase system response curve $\phi = 45°$. This is due to the fact that the continuously-changing log $f$ output voltage portion is always applied to voltage differencer 36, thus effectively adding a continuously frequency-variable offsetting voltage increment to the phase deviation signal on line 40 at the output of the differencer.

What is claimed is:

1. Apparatus for quantitative determination of a variable property of a dielectric material, comprising
   a source of an alternating input voltage having a variable operating frequency,
   a probe having spaced electrodes for electrically coupling said voltage source to a portion of said material to produce an electrical current through said probe with a phase shift with respect to said voltage which tends to vary in response to variations in the dielectric properties of said material,
   phase shift deviation detecting means for establishing a reference value for said phase shift and responsive to said voltage source and to said current for detecting a deviation of said phase shift from said reference value,
   means responsive to said detecting means for changing the operating frequency of said input voltage source in the direction which tends to reduce said phase shift deviation,
   means responsive to said operating frequency of said input voltage source for controlling said deviation detecting means to change said reference value from which a phase shift deviation is detected according to a predetermined function of said operating frequency, and
   means for converting said operating frequency to a signal indicative of the value of said dielectric property of said material.

2. Apparatus as in claim 1 wherein said phase shift deviation detecting means comprises
   a signal channel having a circuit including said probe for producing a signal in response to said current through said probe,
   a reference channel energized by said input voltage source for producing another signal,
   a phase difference detector responsive to said signals produced by said signal and reference channels for producing a phase difference signal,
   a reference signal source for producing a phase reference signal, and
   a signal differencer circuit responsive to said phase difference and phase reference signals for providing a feedback signal to said frequency changing means;
and wherein said frequency-responsive means for controlling said deviation detecting means comprises
   means in one of said signal and reference channels for introducing a frequency-variable phase shift into the signal produced thereby.

3. Apparatus as in claim 2 wherein said frequency-variable phase shift introducing means comprises means for producing a phase lead in one range of said operating frequency and means for producing a phase lag in another range thereof.

4. Apparatus as in claim 2 wherein said frequency-variable phase shift introducing means comprises a low-frequency lead network and a high-frequency lag network in said reference channel.

5. Apparatus as in claim 1 wherein said phase shift deviation detecting means comprises
   means for producing a phase indicator signal indicative of the phase shift between said input voltage and said probe current,
   means for producing a phase selector signal indicative of a predetermined value for said phase shift, and
   means responsive to said phase indicator and phase selector signals for providing a phase deviation signal which is applied to said frequency changing means;
and wherein said controlling means for said deviation detecting means comprises
   means for modifying the value of one of said phase indicator, phase selector and phase deviation signals according to a predetermined function of said operating voltage frequency.

6. Apparatus as in claim 5 wherein said signal modifying means comprises
   means responsive to the operating frequency of said input voltage source for producing a frequency-indicative signal, and
   means for forming an algebraic sum of at least a portion of said frequency-indicative signal and at least a portion of one of said phase indicator, phase selector and phase deviation signals.

7. Apparatus as in claim 6 wherein said means for producing said frequency-indicative signal comprises
   a frequency logger for converting said operating frequency to a signal proportional to a logarithm thereof.

8. In combination with an apparatus for quantitative determination of a variable property of a dielectric material using a variable-frequency alternating voltage source adapted for operation in high, low, and intermediate frequency ranges and a probe having spaced electrodes energized by said voltage source and electrically coupled to said material to produce an electrical current through said probe having a phase shift with respect to said voltage which tends to vary with changes in said variable property, and wherein a phase-shift deviation signal representing a deviation in said phase shift from a nominal reference value is fed back to vary the frequency of said input voltage in the direction which tends to reduce said phase shift deviation to zero, the improvement which comprises
   means responsive to the frequency of said input voltage for introducing into said phase deviation signal an offsetting signal increment which varies with the frequency so as to permit said phase shift deviation to be reduced substantially to zero in said intermediate range of frequencies while preventing the same from being reduced to zero in at least one of said high and low frequency ranges.

9. Apparatus as in claim 8, including
   a detector for said probe current,
   a phase difference detector having first and second input connections for producing a phase indicator signal indicative of the phase shift between signals applied to said input connection,
   means for coupling said probe current detector to said first input connection,
   means for coupling said voltage source to said second input connection,
   a source of a phase shift reference signal, and means responsive to said phase indicator and phase shift reference signals for producing said phase shift deviation signal;

and wherein said offsetting signal increment introducing means comprises means included in one of said coupling means for producing a frequency-dependent phase shift in the signal applied to one of said phase difference detector input connections, so as to produce a frequency-dependent offset in the value of said phase indicator signal and a resulting offset in the value of said phase shift deviation signal.

10. Apparatus as in claim 9 wherein said frequency-dependent phase shift introducing means comprises a low frequency lead network in said means coupling said alternating voltage source to said second input connection of said phase difference detector.

11. Apparatus as in claim 9 wherein said frequency-dependent phase shift introducing means comprises a high frequency lag network in said means coupling said alternating voltage source to said second input connection of said phase difference detector.

12. Apparatus as in claim 9 wherein said frequency-dependent phase shift introducing means comprises a low frequency lead network and a high frequency lag network in said means coupling said alternating voltage source to said second input connection of said phase difference detector.

13. Apparatus as in claim 8 which comprises means for producing a phase indicator signal indicative of the phase shift of said probe current with respect to said alternating voltage, a source of a reference signal, means having applied thereto said phase indicator signal and said reference signal for producing said phase-shift deviation signal in accordance with the difference between said indicator and reference signals, and wherein said offsetting signal increment introducing means comprises means responsive to the frequency of said alternating voltage for variably biasing one of said phase indicator and reference signals according to the frequency of said voltage before said one signal is applied to said phase-shift deviation signal producing means.

14. In combination with an apparatus for quantitative determination of a variable property of a dielectric material using a source of a variable-frequency alternating voltage, a probe having spaced electrodes energized by said voltage source and electrically coupled to said material to produce an electrical current through said probe having a phase shift with respect to said voltage which varies with the frequency of said voltage and with changes in said variable property, and means for producing a phase indicator signal indicative of said phase shift, the improvement which comprises means responsive to the frequency of said voltage for producing a frequency-indicative signal, frequency control means having said phase indicator and frequency-indicative signals applied thereto for controlling the frequency of said alternating voltage source, and means for biasing one of said phase indicator and frequency-indicative signals to introduce a predetermined shift in the level thereof before it is applied to said frequency-control means.

15. Apparatus for quantitative determination of the moisture content of a dielectric material, comprising a variable frequency oscillator for providing an alternating voltage which is variable in frequency from a low frequency range through an intermediate frequency range to a high frequency range, an amplifier having an input and an output, a probe having spaced electrodes for electrically coupling a portion of said material to said oscillator and to said amplifier input, thereby energizing said amplifier to produce at said amplifier output an amplifier output signal with a phase shift with respect to said alternating voltage which tends to change in accordance with changes in the dielectric properties of said material, a phase detector having one input coupled to said amplifier output, another input, and an output for providing a phase detector output signal, reference signal transmission means coupling said other phase detector input to said oscillator, a feedback control device responsive to changes in said phase detector output signal for changing the frequency of said oscillator in the direction which tends to counteract said phase shift changes in said amplifier output signal which would otherwise occur due to said changes in said material properties, means responsive to the frequency of said oscillator for variably biasing the operation of said feedback control device according to a predetermined function of frequency so as to prevent the oscillator frequency changes effected by said device from completely eliminating said phase shift changes in at least one of said high and low frequency ranges, and means for converting said oscillator frequency to a signal indicative of said moisture content of said material.

16. Apparatus as in claim 15 wherein said means for biasing the operation of said feedback control device comprises.

a frequency logger responsive to said oscillator frequency for providing to said feedback control device a biasing signal which varies with a logarithm of said oscillator frequency.

17. Apparatus as in claim 15 wherein said means for biasing the operating of said feedback control device comprises a frequency logger responsive to said oscillator frequency for providing a logarithmically varying signal proportional to a logarithm of said oscillator frequency, and level-shifting means connecting said logarithmically varying signal to said feedback control device so as to cause said device to substantially eliminate changes in the phase shift between said amplifier output signal and said alternating voltage at a selected frequency in said intermediate frequency range.

18. The method of measuring a variable property of a dielectric material using a probe having spaced electrodes electrically coupled to said material and energized with an alternating input voltage to produce a complex current through said probe with a phase shift which tends to vary with respect to a reference value in accordance with variations in the dielectric properties of said material, comprising the steps of changing the frequency of said voltage to maintain said phase shift substantially equal to said reference value, changing said reference value according to a predetermined variable function of the frequency of said voltage, and producing a signal indicative of the value of said property as a function of the frequency of said voltage.

19. The method of measuring a dielectric material to quantitatively determine a variable property thereof which is subject to variation from a range of low values through a range of intermediate value to a range of high values, using a probe having spaced electrodes electrically coupled to said material and energized with an alternating voltage to produce a complex current through said probe with a phase shift which tends to vary with respect to a reference value in accordance with variations in said property, comprising the steps of changing the frequency of said voltage when said phase shift tends to vary as a result of changes in said property so as to maintain said phase shift substantially equal to said reference value, changing said reference value according to a variable function of the frequency of said voltage when the value of said property departs from said range of intermediate values and varies into one of said low and high ranges of values so as to reduce the extent of the frequency changes required to maintain said phase shift substantially equal to the changed reference value, and producing a signal indicative of the value of said property as a function of the frequency of said voltage.

References Cited

UNITED STATES PATENTS

| | | | |
|---|---|---|---|
| 2,985,825 | 5/1961 | Whittier | 324—60 XR |
| 3,230,449 | 1/1966 | Kaiser | 324—60 |
| 3,292,077 | 12/1966 | Sloughter | 324—40 XR |

RUDOLPH V. ROLINEC, *Primary Examiner.*

E. E. KUBASIEWICZ, *Assistant Examiner.*